Oct. 19, 1937.   C. C. FARMER   2,096,485
MAGNETIC TRACK BRAKE
Filed Feb. 23, 1935   7 Sheets-Sheet 1

Fig.1

INVENTOR
CLYDE C. FARMER.
BY *Wm. M. Cady*
ATTORNEY

Oct. 19, 1937.    C. C. FARMER    2,096,485
MAGNETIC TRACK BRAKE
Filed Feb. 23, 1935    7 Sheets-Sheet 3

INVENTOR
CLYDE C. FARMER.
BY *Wm. M. Cady*
ATTORNEY

Oct. 19, 1937. C. C. FARMER 2,096,485
MAGNETIC TRACK BRAKE
Filed Feb. 23, 1935 7 Sheets-Sheet 5

INVENTOR
CLYDE C. FARMER.
BY *Wm. M. Cady*
ATTORNEY

Oct. 19, 1937.   C. C. FARMER   2,096,485
MAGNETIC TRACK BRAKE
Filed Feb. 23, 1935   7 Sheets-Sheet 7

INVENTOR
CLYDE C. FARMER.
BY *Wm. M. Cady*
ATTORNEY

Patented Oct. 19, 1937

2,096,485

UNITED STATES PATENT OFFICE 2,096,485

MAGNETIC TRACK BRAKE

Clyde C. Farmer, Pittsburgh, Pa., assignor to The Westinghouse Air Brake Company, Wilmerding, Pa., a corporation of Pennsylvania Application February 23, 1935, Serial No. 7,746

40 Claims. (Cl. 188—165)

This invention relates to brake equipment adapted for use on railway vehicles and particularly to brake equipment of the type employing magnetic track brake shoes.

It is an object of this invention to provide an improved braking system of the type employing magnetic track brake shoes.

A further object of this invention is to provide an improved braking system of the type employing magnetic track brake shoes and having improved means to move the track brake shoes into and out of operating relation with the track.

It is another object of this invention to provide an improved braking system of the type employing magnetic track brake shoes and having improved means to transmit from the brake shoes to the vehicle the retarding force produced by the track brake shoes.

It is a further object of this invention to provide an improved braking system of the type employing a magnetic track brake shoe and having safety means automatically operable to de-energize the track shoe and to move it away from the track in the event that the track shoe strikes an obstruction which results in the mechanical failure of certain parts.

It is another object of this invention to provide an improved braking system of the type employing magnetic track brake shoes in which improved means are provided to support the track shoes in proper relation to the track and to permit the track shoes to have a limited amount of movement relative to the track and relative to the supporting means, whereby the track shoes can adjust themselves to irregularities in the track.

Other objects of the invention and features of novelty will be apparent from the following description taken in connection with the accompanying drawings, in which.

Figure 1:
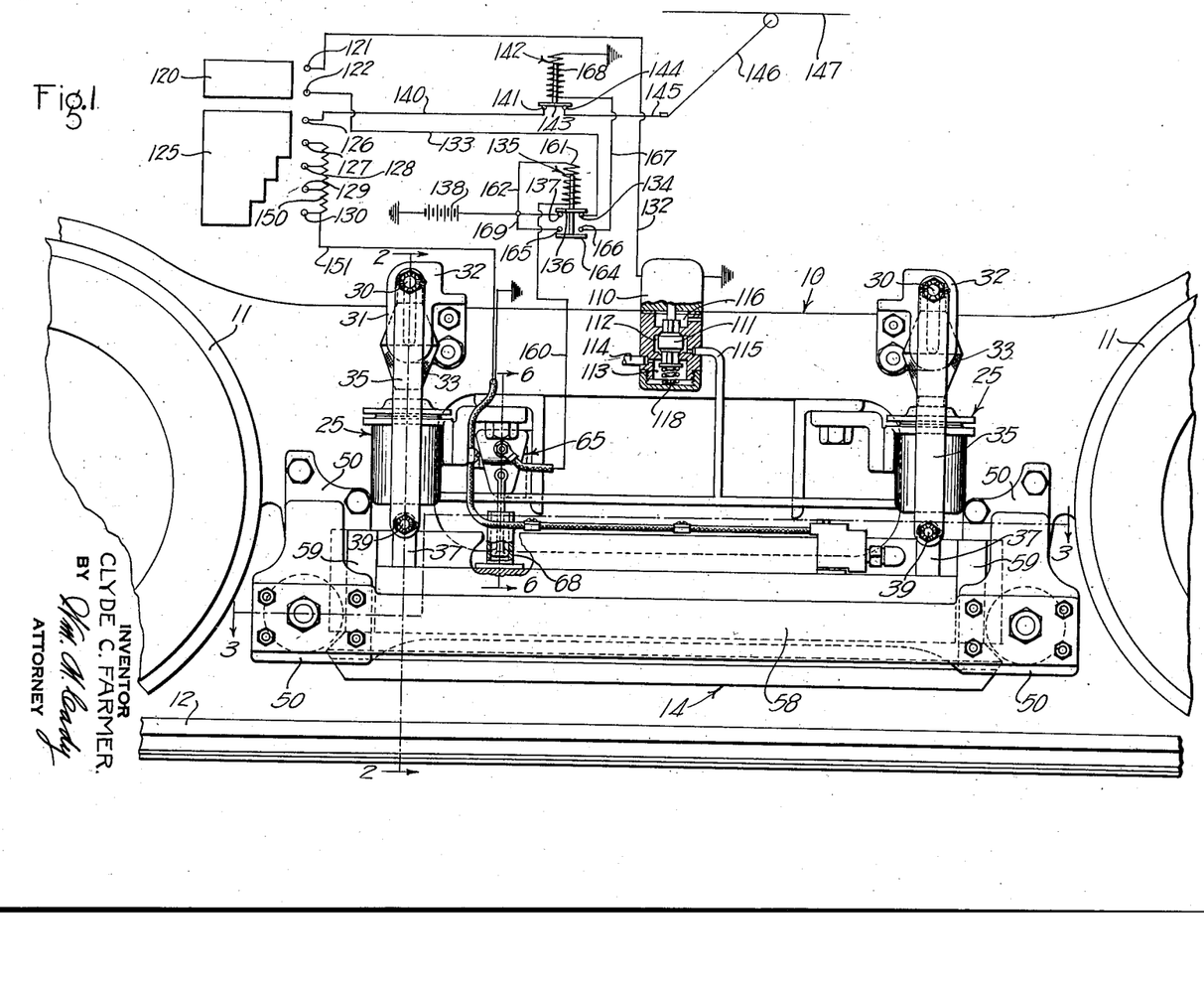
Figure 1 is an elevational view of one embodiment of the improved magnetic track brake equipment provided by my invention, with parts broken away and shown in section in order to more clearly reveal other parts, the control apparatus for the equipment being shown diagrammatically.

Referring to Figure 1 of the drawings I have illustrated a fragmentary view of the truck of a railway vehicle equipped with one embodiment of the improved magnetic track brake equipment provided by my invention. As shown in this figure of the drawings the vehicle truck comprises a truck frame, indicated generally by the reference character 10, and which may be of any suitable construction and which serves to support the vehicle body, (not shown) on the vehicle wheels 11 which are adapted to run on the rail 12 in a manner well known in the art.

Figure 2:
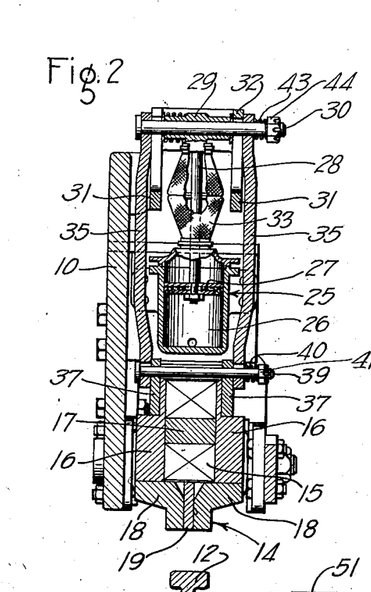
Figure 2 is a sectional view taken along the line 2—2 of Figure 1.

The brake equipment includes a plurality of magnetic track brake shoes one of which is illustrated and is indicated generally by the reference character 14, which is supported from the truck frame 10 at a point intermediate the wheels 11 and substantially vertically above the rail 12. As is best shown in Figure 2 of the drawings, the track shoe 14 comprises an electromagnetic winding 15 and a core constructed of suitable magnetic material and including side members 16 which are joined by an intermediate member 17, and the track engaging portions 18 which are separated by a member 19 which is constructed of a suitable non-magnetic material, such as brass or bronze.

The lower face of the members 18 and 19 are preferably of a width substantially the same as or less than the width of the top of the rail 12, and as will be seen in Figure 1 of the drawings, the track shoe 14 may extend substantially the entire distance between the wheels 11 associated with the vehicle truck.

The core members 16, 17 and 18 provide a path for the magnetic flux created by the winding 15, which path extends from one track engaging member 18 to one of the side members 16, through the intermediate member 17 to the other side member 16, and thence to the other track engaging member 18. When the track brake shoe is in engagement with the rail 12 the magnetic path is completed between the track engaging members 18 through the body of the rail 12.

The track brake shoe 14 has fluid pressure operated devices or raising cylinders indicated generally at 25 associated therewith to control movement of the shoe into or out of operative relation with the rail 12. As shown in the drawings, particularly Figures 1 and 2 thereof, a pair of devices are employed and these are secured to the truck frame 10 in any suitable manner and are disposed vertically above the track brake shoe 14 adjacent the ends thereof. Each of these fluid pressure responsive devices or raising cylinders has a piston chamber 26 formed therein and each has a piston 27 reciprocable in said chamber responsive to variations in the pressure of the fluid in the chamber. Each of the pistons 27 has a rod 28 connected thereto which may be enclosed by a flexible protecting jacket 33 to prevent access of foreign matter to the rod and the interior of the air cylinder and each of the rods 28 has a crosshead 29 secured on the end thereof.

The crossheads 29 each have a pin or bolt 30 extending therethrough and reciprocally movable in the elongated openings formed in the spaced arms 31 of the guide members 32 which are secured in any suitable manner to the truck frame 10. The elongated slots in the arms 31 serve to guide the crossheads 29 when the pistons 27 are reciprocated. These guide members are not essential to the brake equipment and may be omitted if desired.

The pins 30 each have a pair of links 35 pivotally secured thereon outwardly of the arms 31, and the lower ends of these links are pivotally secured by means of pins or bolts 39 to ears 37 which project upwardly from the upper face of the track brake shoe 14. As is shown in the drawings the links 35 are positioned on opposite sides of the fluid pressure responsive devices 25.

The apertures in the lower ends of the links 35, through which extend the pins 39, are preferably somewhat elongated in a vertical direction so as to permit a limited amount of movement of the links and the track brake shoe 14 relative to each other in a vertical direction.

The lower ends of the links 35 are yieldingly held in engagement with the ears 37 on the track brake shoe 14 by means of springs 40 positioned between the outer faces of the links and the nuts 41 on the ends of the bolts or pins. This construction permits the track brake shoe to move laterally of the car relative to the links 35 a limited amount.

A similar construction is employed at the upper ends of the links 35 where it will be seen that springs 43 are interposed between the nuts 44 and the outer faces of the links 35 so that the heads of the bolts or pins 30 are pulled into engagement with the links on the opposite side of the crossheads from the springs 43 and so that the links 35 engaged by the springs 43 are pressed firmly into engagement with the arms 31 of the guide members 32. This construction permits the links 35 to be shifted laterally of the car a limited amount relative to the crossheads 29 and the guiding members 32.

The movement which is permitted between the track brake shoe 14 and the links 35 and between the links 35 and the crossheads 29 is desirable as it permits the track brake shoe 14 to readily adjust itself laterally of the car so as to accommodate variations or irregularities in the track due to curves or for other reasons.

Figure 3:
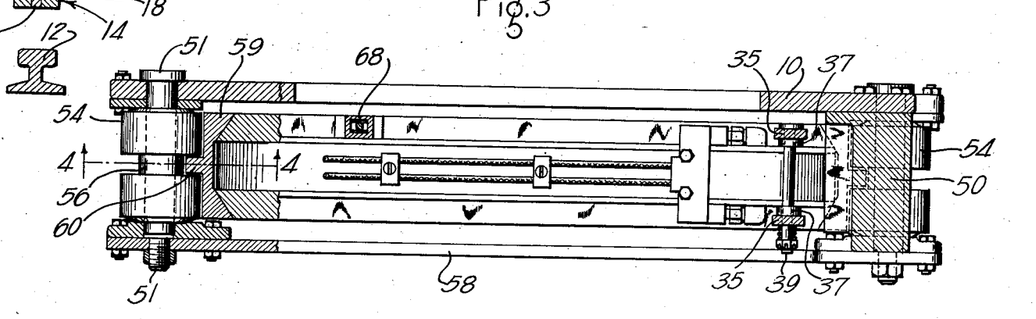
Figure 3 is a sectional view taken along the line 3—3 of Figure 1.
Figure 4:
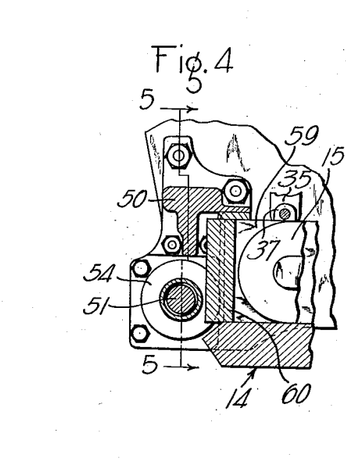
Figure 4 is a sectional view taken along the line 4—4 of Figure 3.
Figure 5:
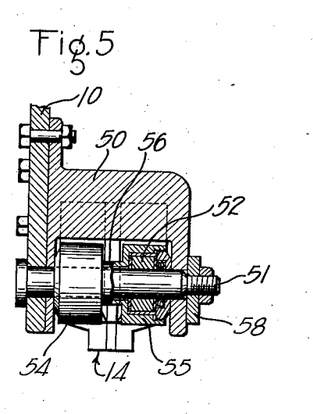
Figure 5 is a sectional view taken along the line 5—5 of Figure 4.

In addition to the means for controlling movement of the track brake shoe out of operative relation with the rail 12 there is provided means to guide the track brake shoe during this movement and to maintain it in the proper position relative to the truck frame 10 when it is in engagement with the rail. In the embodiment of the invention illustrated in Figure 1 there are a pair of spaced brackets 50, the construction of which is shown in detail in Figures 3 and 5 of the drawings. In each of the brackets is rotatively supported on a shaft or pin 51 by means of suitable anti-friction or roller bearings 52 a grooved roller 54 having a pair of substantially cylindrical end portions 55 separated by an annular intermediate portion 56 of smaller diameter. One of the brackets 50 is positioned adjacent one end of the track brake shoe 14, while the other bracket is positioned adjacent the other end of the track brake shoe and these brackets are joined by a connecting member 58.

The track brake shoe 14 is proportioned so that it is of substantially the same length as the distance between the rollers 54. The ends of the track brake shoe are provided with end pieces 59 of non-magnetic material having tongues 60 adapted to extend into the grooved portions 56 of the rollers 54. The tongues 60 are preferably made somewhat narrower than the width of the annular grooved portions 56 on the rollers 54 so that a limited amount of lateral movement is permitted the track brake shoe 14 relative to the rollers 54.

As is best shown in Figure 1 of the drawings the end pieces 59 extend vertically throughout a relatively great distance so that when the track brake shoe 14 is in engagement with the top of the rail 12 one of the end pieces 59 will be in engagement with one of rollers 54, and the top surface of the end piece will be located above the horizontal center line of the roller. When the track brake shoe is in engagement with the rail and therefore is in its operative position, the braking force which is developed between the brake shoe and the rail will be transmitted through an end of the brake shoe to one of the rollers 54, depending upon the direction of movement of the vehicle, and therefrom through the bracket member 50 to the vehicle truck.

When the track brake shoe is lifted away from the rail to release the brake it can be lifted very easily because it is guided by the rollers 54, and these being mounted on anti-friction or roller bearings, offer very little resistance to the movement of the track brake shoe.

The brake equipment provided by my invention has manually controlled means to control the supply of current to the winding 15 of the track brake shoe 14 and to control the supply and release of fluid under pressure to the fluid pressure responsive devices or raising cylinders to control movement of the track brake shoe towards and away from the rail.

The supply and release of fluid under pressure to the fluid pressure responsive devices is controlled by a magnet valve device, indicated generally by the reference character 110, and having a double beat valve element 111 positioned in a valve chamber 112 which communicates with a fluid pressure supply chamber 113 to which is connected a supply pipe 114 leading from a suitable source (not shown) of fluid under pressure. The valve chamber 112 also communicates with the chambers 26 in the fluid pressure responsive devices by way of the branched pipe 115. The magnet valve device also has a release chamber 116 which communicates with the atmosphere and with the valve chamber 112. The valve element 111 is normally biased to its upper seated position by means of a spring 118 so as to normally open a passage between the supply chamber 113, which communicates with the supply pipe 114, and the valve chamber 112 which communicates with the fluid pressure responsive devices by way of the pipe 115. This permits fluid under pressure to be supplied to the fluid pressure responsive devices.

The magnet valve device 110 has a winding associated therewith and operable when energized to urge the valve element 111 downwardly into engagement with its lower seat so as to cut off communication between the supply chamber 113 and the valve chamber 112, and to open communication between the chamber 112 and the release chamber 116, thereby permitting the release of fluid under pressure from the fluid pressure responsive devices through the pipe 115 to the chamber 112 and thence to the release chamber 116 and the atmosphere.

A brake switch is provided which is adapted to control the circuit to the winding of the magnet valve device 110 and the energization of the winding of the track brake shoe 14. This switch may comprise a rotatable drum upon which is mounted a contact 120 which is adapted to engage at certain times the stationary contacts 121 and 122 to control the circuit to the winding of the magnet valve device, and a contact 125 which is adapted to engage at certain times, as will hereinafter more fully appear, certain of the stationary contacts 126 to 130, inclusive, associated with the resistance 150 to control the degree of energization of the winding 15 of the track brake shoe 14.

One terminal of the winding of the magnet valve device 110 is connected to ground, while the other terminal is connected by means of the wire 132 to the contact 121. The contact 122 is connected by means of the wire 133 to one contact 134 of a normally closed relay 135. The contact 134 is engaged by the contact member 136 which also engages the contact 137 which is connected to a suitable source of current, such as the battery 138, the other terminal of which is connected to ground. As will be understood when the drum on which the contact 120 is mounted is rotated to the brake application position the contact 120 will engage the contacts 121 and 122 to complete a circuit therebetween, thus completing a circuit through the winding of the magnet valve device 110 which circuit includes the wire 132, contacts 121, 120, and 122, wire 133, contacts 134, 136 and 137 and the battery 138. Upon energization of the winding of the magnet valve device the valve element 111 is moved to its lower seated position against the pressure of the spring 118 and permits the fluid under pressure in the chambers 26 of the fluid pressure responsive devices to escape through the pipe 115 to the valve chamber 112 and to the release chamber 116 and therefrom to the atmosphere. Upon the release of the fluid under pressure from the fluid pressure responsive devices the track brake shoe is permitted to drop into engagement with the track 12, being moved to this position by gravity.

When the contact 120 is moved out of engagement with the contacts 121 and 122 the circuit to the winding of the magnet valve device is interrupted and the valve element 111 is moved upwardly by the spring 118 to its upper seated position to cut off communication between the chamber 112 and the atmosphere, and to open communication between the supply chamber 113 and the chamber 112 so as to permit fluid under pressure supplied from the pipe 114 to flow to the fluid pressure responsive devices so that the pistons or abutments associated with these devices are forced upwardly to move the track brake shoe away from the track.

In addition to controlling the circuit through the winding of the magnet valve device the brake control means also controls the degree of energization of the winding of the track brake shoe. As shown in Figure 1 of the drawings the contact 126 has connected thereto a wire 140 which is connected to the contact 141 associated with the normally closed relay 142. The contact 141 is engaged by a contact 143 which also engages the contact 144 which is connected by means of wire 145 with the trolley 146 which engages the trolley wire 147. Current therefore flows from the trolley wire through the normally closed relay 142 to the contact 126.

The movable contact 125 is normally disengaged from the contact 126 which is connected with the trolley and also from the contacts 127 to 130. Thus the energizing circuit to the magnet winding 15 is open and the track brake shoe remains deenergized.

When it is desired to effect an application of the brakes the brake switch is turned from the release position toward the full service position a degree in accordance with the desired degree of braking. For purposes of illustration assume that the brake switch is moved to the position in which the movable contact 125 engages the fixed contact 127. When the brake switch has been turned to this position current is supplied to the winding 15 of the track shoe 14 by the wire 151 through the portion of the resistance 150 in series therewith, which is the portion between the contact 127 and the contact 130, thereby providing one degree of braking effectiveness.

When the brake switch is moved to the full service position all of the resistance 150 is cut out of the circuit to the magnet winding 15 so that the magnet winding is energized to a maximum degree, thereby providing a maximum degree of braking effectiveness.

It will be seen that the contact 120 which controls the circuit through the winding of the magnet valve device 110, which in turn controls the supply and release of fluid under pressure to and from the pressure responsive devices, and the contact 125 which controls the degree of energization of the winding of the track brake shoe are mounted on the drum of the brake switch in such a manner that current is supplied to the winding of the track brake shoe at the same time that the circuit is completed to the winding of the magnet valve device. Upon energization of the winding of the magnet valve device fluid under pressure is released from fluid pressure responsive devices so that these devices are operated to permit the track brake shoe to move toward the rail, and as the circuit through the winding of the track brake shoe is completed at the same time, magnetic flux will be established in the track brake shoe so that as the track brake shoe approaches the rail it will be attracted thereto by the flux in the brake shoe. This insures that the track brake shoe will firmly engage the rail and that there will be no bouncing or up and down movement of the track brake shoe due to irregularities in the track which might take place if the track brake shoe were not energized until after it was moved into engagement with the rail.

It will be seen also that to release the brakes the brake switch is moved to its release position so that the contact 120 controlling the circuit to the magnet valve device 110 is disengaged from the contacts 121 and 122 to interrupt the circuit to the magnet valve device, and at the same time, the contact 125 is moved out of engagement with the contacts 126 and 127 to interrupt the circuit through the winding of the track brake shoe, thereby deenergizing this winding.

As soon as the winding of the magnet valve device 110 is deenergized the valve element 111 is moved to its upper seated position to open communication between the supply chamber 113 and the valve chamber 112 and permit fluid under pressure to flow from the pipe 114 to the pipe 115 and therefrom to the fluid pressure responsive devices to lift the track brake shoe away from the track. This can be accomplished easily as the winding of the track brake shoe is deenergized.

Figure 7:
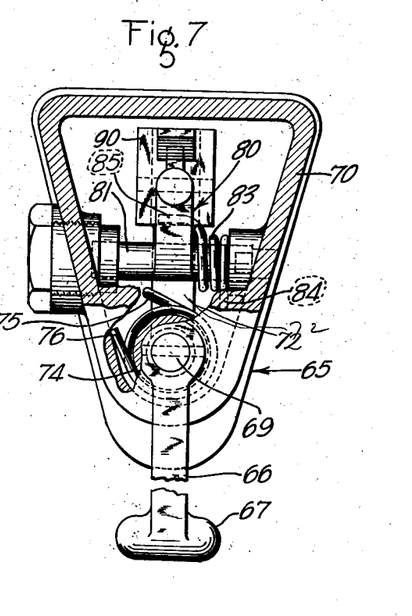
Figure 7 is a sectional view taken along the line 7—7 of Figure 6.
Figure 8:
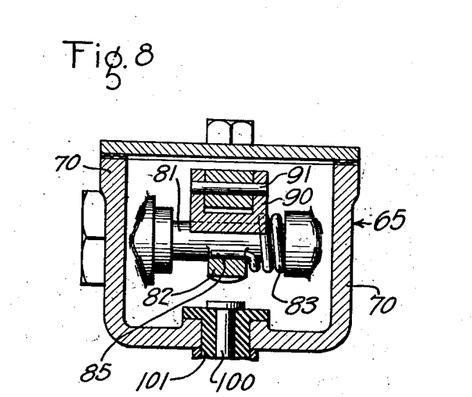
Figure 8 is a sectional view taken along the line 8—8 of Figure 6.

The brake equipment provided by my invention also includes safety means which operates automatically to deenergize the track brake shoe and to lift the shoe away from the track in event that the shoe strikes an obstruction and causes failure of the supporting members. As shown in the drawings this means includes a trip switch which is operable in response to excessive movement of the track brake shoe longitudinally of the vehicle truck. The trip switch is shown positioned on the vehicle truck in Figure 1 of the drawings, and is indicated generally by the reference character 65. The construction of this switch is shown in detail in Figures 6, 7 and 8 of the drawings.

The trip switch 65 comprises a lever 66 having an enlarged end portion 67 adapted to extend into a socket 68 which is secured to the upper face of the track brake shoe 14 and is open at its upper end. The arm 66 is secured on a shaft 69 which is journalled in the housing section 70 and this shaft has secured on the other end thereof a lever 72. The lever 72 is normally biased to move in a clockwise direction, as viewed in Figure 7 of the drawings, by means of the torsional spring 74, which has one end thereof, indicated at 75, engaging a portion of the lever 72 and which has the other end thereof, and indicated at 76, engaging a portion of the interior of the housing 70.

The housing 70 has a contact 80 rotatively supported therein so as to be rotatable on an axis extending generally perpendicular to the axis of the shaft 69. The contact 80 includes a shaft portion 81 which is supported in suitable bearings in the housing 70, and an arm portion 82 extending therefrom. The contact member 80 is biased to move in a clockwise direction, as viewed in Figure 6 of the drawings, by means of a torsional spring 83 which has one end thereof 84 in engagement with a portion of the housing 70 and which has its other end 85 engaging the arm portion 82 of the contact member.

Figure 6:
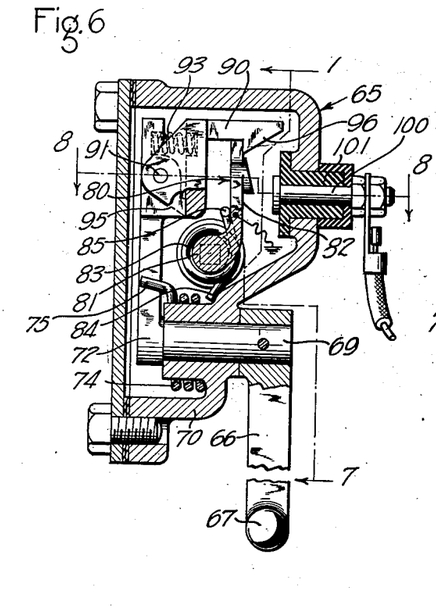
Figure 6 is a sectional view of the safety trip switch employed in the equipment shown in Figure 1, this view being taken along the line 6—6 of Figure 1.

The lever 72 has a trigger or latch indicated generally by the reference character 90 pivotally secured at the outer end thereof on a pin 91. The trigger or latch 90 is urged in the clockwise direction by means of the compression spring 93 so that the lower end of the trigger or latch engages the stop 95 formed on the lever 72. The end of the trigger or latch 90 has a projecting portion indicated at 96 and adapted to project downwardly beyond the end of the arm portion 82 of the contact 80 in order to prevent rotation of this member in a clockwise direction.

The housing 70 also has secured thereto a contact member 100 which may be constructed of any suitable material, and which is electrically insulated from the housing by means of a suitable fiber bushing indicated at 101. The contact 100 is positioned opposite the contact 80 so as to be engaged thereby on movement of the contact 80 in a clockwise direction. The contact member 80 is connected to ground, as indicated in Figure 6 of the drawings, while the contact member 100 has its outer end threaded and provided with nuts for the attachment of a connecting wire.

In the operation of the trip switch when the arm 66 is in the normal position, which is the position which it assumes when the end 67 is in the socket 68 the contact 80 is held by the trigger 90. If the track shoe strikes an obstruction which offers sufficient resistance to its movement to cause the supporting members to yield so that the track shoe is moved longitudinally of the car a distance greater than that normally permitted by the brackets 50, the lever 66 will be moved and will effect rotation of the lever 72 so that the trigger or latch 90 is moved out of the way of the end of the contact member 80. The contact 80 will then be rotated by the torsional spring 83 and will engage the contact member 100 to complete a circuit therethrough.

The contact member 100 has a wire 160 connected thereto and the other end of this wire is connected to one end of the winding 161 of the relay 135. The other end of the winding is connected to one side of the battery 138 by means of a wire 162. When the contact 80 engages the contact 100 a circuit is completed through the winding 161, and, on energization of this winding, contact 136 is moved out of engagement with the contacts 134 and 137 thereby interrupting the circuit to the winding of the magnet valve device 110. At the same time the contact 164 is moved into engagement with the contacts 165 and 166 to complete a circuit therebetween. The contact 166 is connected by means of the wire 167 with one end of the winding 168 of the relay 142 and the other end of this winding is connected to ground. The contact 165 is connected by means of the wire 169 to one side of a source of current which may be the battery 138, the other terminal of which is connected to ground. Upon the completion of a circuit between the contacts 165 and 166 a circuit is established through the winding 168 of the relay 142, and, on energization of this winding, the contact 143 is moved out of engagement with the contacts 141 and 144 to interrupt the circuit leading from the trolley wire 147 to the winding 15 of the track brake shoe.

It will be seen therefore that the circuit associated with the contact member 100 controls means to cut off the energizing current to the winding 15 of the track brake shoe 14 and to interrupt the circuit through the winding of the magnet valve device 10 so as to effect the supply of fluid under pressure to the fluid pressure responsive devices to lift the track brake shoe away from the track upon completion of the circuit through the contact member 100. This insures that the track brake shoe will be lifted away from the track and prevents the track shoe from getting under the vehicle wheels in the event that the shoe strikes an obstruction.

The operation of the safety means is assisted by the construction which is employed to support the track brake shoe from the vehicle truck frame and to effect movement of the track brake shoe into and out of operating relation with the rail. Referring to Figure 1 of the drawings it will be seen that the track brake shoe is supported by means of the links 35 which are pivoted on the bolts 30 at points substantially above the track brake shoe. In the event that the track brake shoe strikes an obstruction which moves it longitudinally of the car a distance greater than that permitted by the guiding rollers 54, the links 35 will pivot about the bolts 30. The track brake shoe will be held in engagement with the track at this time because of the energization of the winding of the track shoe. As a result of movement of the vehicle relative to the track shoe the links 35 will move the bolts 30 downwardly, but the amount of this downward movement will be limited by the lower ends of the slots in the arms 31 by which the bolts are guided.

When the bolts 30 engage the lower ends of these slots further downward movement of these bolts is prevented, and, on further relative movement of the vehicle and track shoe, the bolts cause the links 35 to exert a pull on the track shoe tending to lift the shoe off from the track.

After a relatively short movement of the track shoe longitudinally of the car the trip switch 65 will be actuated to complete the circuit controlled thereby to effect deenergization of the winding of the track shoe so that the downward pull on the links 35 will be relatively small. At the same time the winding of the magnet valve device 110 is deenergized so as to effect the supply of fluid under pressure to the fluid pressure responsive devices with the result that the pistons 27 associated with these devices will be moved upwardly, and this movement will be transmitted to the links 35 and to the track shoe to lift the track shoe away from the rail.

In the construction in which the guide members 32 are omitted the downward movement of the links 35 will be limited by the pistons 27 which will engage the lower ends of the chambers 26 in which they are mounted. On further movement of the track shoe and vehicle relative to each other the links 35 will tend to lift the track shoe away from the rail in the same manner as described in detail above.

Figure 9:
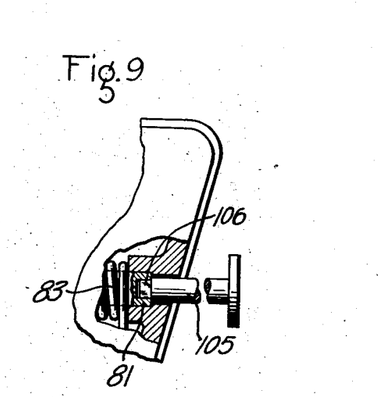
Figure 9 is a fragmentary view illustrating the means employed to reset the trip switch.
Figure 10:
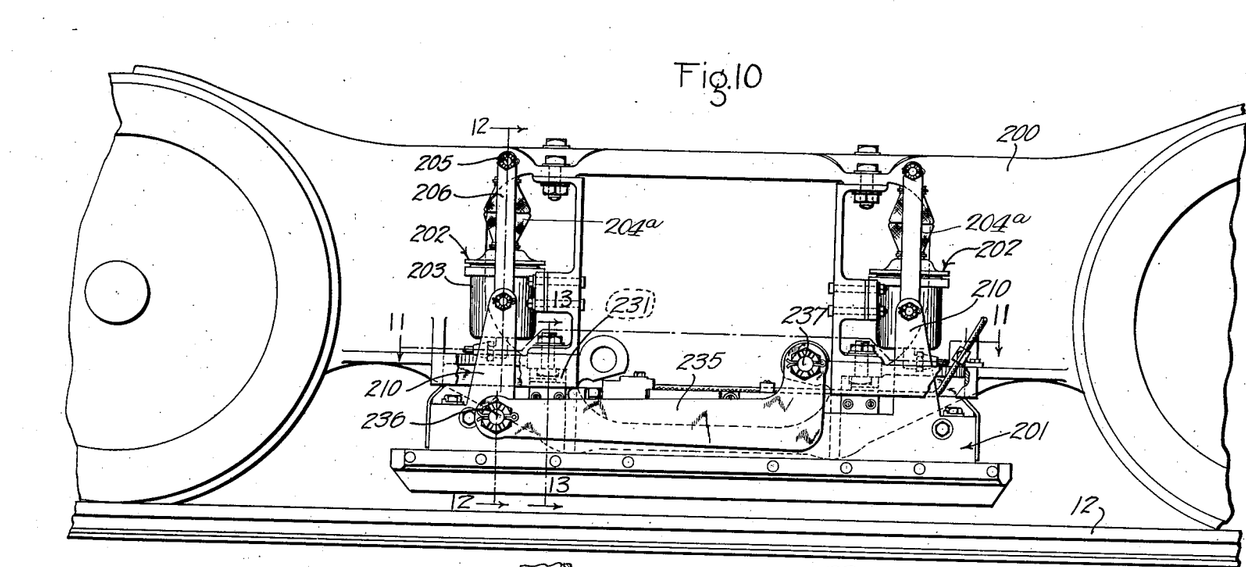
Figure 10 is an elevational view of another embodiment of the improved magnetic track brake equipment provided by my invention.
Figure 11:
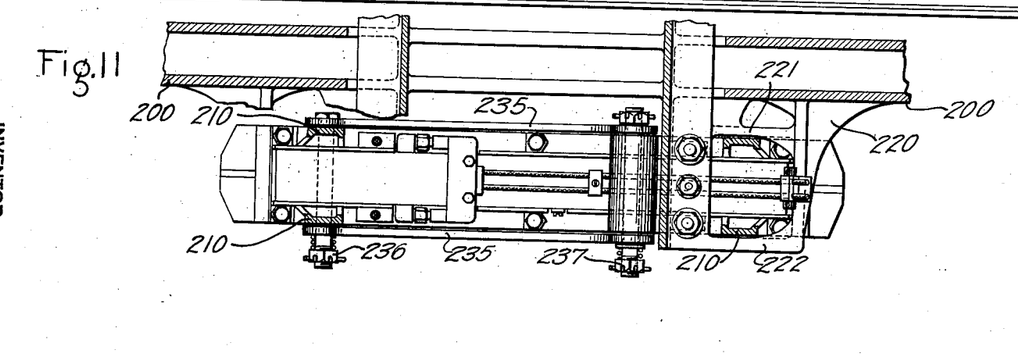
Figure 11 is a sectional view taken along the line 11—11 of Figure 10.

In order to reset the trip switch after it has been operated, a key indicated at 105 in Figure 9 of the drawings and having a square end portion 106 is inserted in an opening in the housing 70 so as to engage a square socket formed in the end of the shaft portion 81 of the contact member 80. By means of this key the contact member 80 is rotated in a counterclockwise direction, as viewed in Figure 6, against the spring 83 so that the upper end of the contact member is positioned to the left of the downwardly projecting portion 96 of the trigger 90. When the contact 80 is moved in this manner, the lever 66 having previously been rotated to a position in which the lever 72 is in a substantially vertical position, the end of the arm 82 of the contact member 80 engages the sloping face of the downwardly projecting portion 96 forcing the trigger or latch 90 to be rotated about the pin 91 against the pressure of the spring 93 until the arm 82 is moved beyond the projecting portion 96, at which time the spring 93 forces the trigger or latch downwardly to prevent the return of the contact member 80. The key 105 is now removed and the trip switch is again ready for operation.

In Figures 10 to 13, inclusive, of the drawings I have illustrated another embodiment of the improved magnetic track brake equipment provided by my invention. This embodiment of the invention is generally similar to that shown in Figure 1 of the drawings. The vehicle truck frame is indicated generally by the reference character 200, and the track brake shoe, which is supported from the truck frame intermediate the wheels and vertically above the track 12 is indicated generally by the reference character 201. The track shoe 201 is similar in construction to the track shoe 14 which was illustrated and described in detail in connection with the embodiment of the invention shown in Figure 1 of the drawings.

This embodiment of the invention also employs fluid pressure responsive means to control movement of the track brake shoe out of engagement with the rail 12, and this means comprises a pair of fluid pressure responsive devices indicated generally by the reference character 202, each of which is similar in construction to the corresponding devices employed in the system shown in Figure 1.

Figure 12:
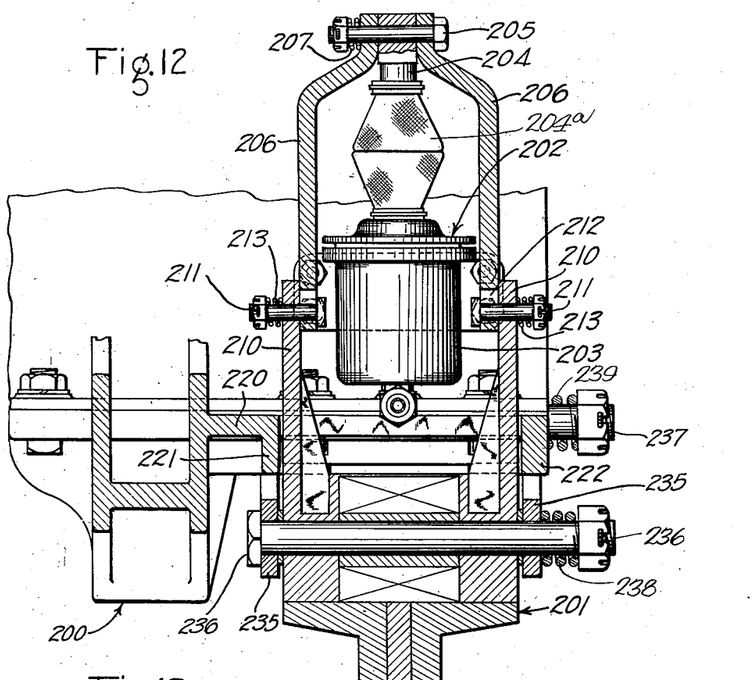
Figure 12 is a sectional view taken along the line 12—12 of Figure 10.
Figure 13:
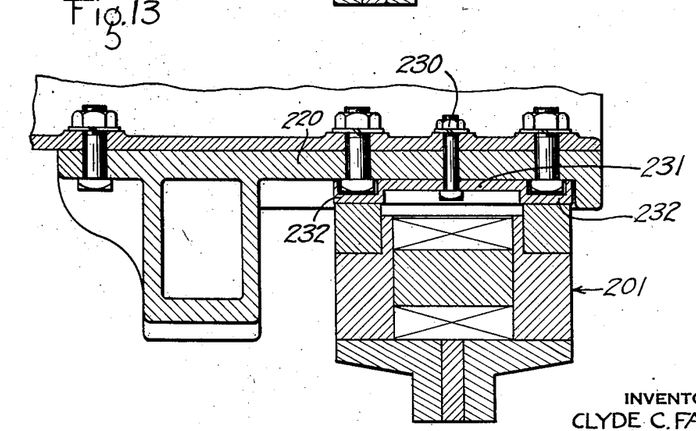
Figure 13 is a sectional view taken along the line 13—13 of Figure 10.

Each of the pressure responsive devices 202 includes a member 203 having a piston chamber therein in which is reciprocally mounted a piston having a shaft 204 secured thereto, which may be enclosed in a flexible jacket 204a, and which has pivotally secured adjacent the upper end thereof by means of a suitable pin or bolt 205 the links 206. The links 206 are preferably yieldingly held in engagement with the rod 204 by means of a spring 207 mounted on the bolt 205. The lower ends of the links 206 are offset with respect to the upper ends and are adapted to extend alongside the member 203. The lower ends of these links 206 are pivotally secured to the upwardly projecting ears 210 on the track brake shoe 201. The openings 212 in the lower ends of the links 206 through which extend the bolts 211, by means of which the links are secured to the ears 210, are elongated somewhat vertically, as is best shown in Figure 12 of the drawings, so as to permit a limited amount of vertical movement of the links and the track shoe relative to each other. The bolts 211 have springs 213 fitted thereon to yieldingly press the links 206 into engagement with the inner faces of the ears 210 and at the same time permit a limited amount of lateral movement of the track brake shoe 201 relative to the links.

This embodiment of the braking system provided by my invention includes means to limit lateral movement of the track brake shoe relative to the vehicle, and, as shown in the drawings, this means comprises stirrups or brackets formed on the truck frame 200 and surrounding the upwardly projecting ears 210 associated with the track brake shoe. The stirrups or brackets are indicated generally by the reference character 220 and project from the face of the vehicle truck at points above the track brake shoe and adjacent the ends of the shoe. Each of the stirrups or brackets 220 comprises a portion 221 positioned adjacent the laterally inner face of the track brake shoe so as to limit inward movement of the track brake shoe, and a portion 222 positioned adjacent the laterally outer face of the track brake shoe 201 so as to limit outward movement of the track brake shoe. The stirrups or brackets 220 are preferably formed integral with the truck frame 200 and the track brake shoe 201 is assembled by inserting the ears 210 in the openings in the stirrups from the bottom and then attaching the links 206 to the ears by means of the bolts 211.

This embodiment of the invention also has means to limit the upward movement of the track brake shoe. The projecting portion of the truck frame 200 which forms the stirrups or brackets 220 has secured on the lower face thereof, by means of bolts 230, members 231 which may be constructed of any suitable non-magnetic material, such as molded plastic composition, and which are adapted to be engaged by the upper face of the track shoe 201 when the track shoe is in its upper position. In the preferred embodiment the members 231 have downwardly projecting portions 232 adjacent the ends thereof which are adapted to be engaged by the edges of the track shoe 201. When the track shoe 201 is moved to its upper position, and is held in this position by fluid under pressure in the fluid pressure devices, it engages the molded composition members 231 so as to be firmly held in the release position. Each of the stirrups or brackets 220 has one of the members 231 associated therewith so that each end of the track brake shoe is in engagement with one of the members when the track brake shoe is moved to its upper position.

This embodiment of the invention also includes means to transmit from the track brake shoe to the vehicle frame the braking force produced between the track brake shoe and the rail. In this embodiment of the invention this force is transmitted between the track shoe and the truck frame by means of thrust bars 235 which have one end pivotally secured to the track shoe 201 adjacent one end of the track shoe by means of a pin or bolt 236, and which have their other ends pivotally secured to the truck frame at a point adjacent the other end of the track shoe by means of a pin or bolt 237 which extends through an eye formed on one of the stirrups or brackets 220. One of the thrust bars 235 is positioned adjacent the lateral inner face of the track shoe and the other is positioned on the lateral outer face of the track shoe.

As is clearly shown in Fig. 12 of the drawings, the bolt 236 has a spring 238 mounted thereon which yieldingly presses the thrust bars 235 against the faces of the track shoe 201 and permits relative lateral movement between the thrust bars 235 and the track shoe 201, while the bolt 237 has a spring 239 mounted thereon which yieldingly presses the thrust bars 235 against the ends of the eye in the bracket or stirrup 220 through which the bolt 237 extends and permits relative lateral movement between the thrust bars 235 and the bracket or stirrup 220, and in addition, the springs 238 and 239 permit relative lateral movement between the thrust bars 235.

In the preferred embodiment of the invention the members on which the ends of the thrust bars are pivoted are spaced apart longitudinally of the car a substantial distance, and the member on which the thrust bars are pivotally secured to the truck frame is located longitudinally forwardly and vertically above the member on which the thrust bars are pivotally secured to the track shoe. If, therefore, the forward end of the track shoe, which is the right hand end as viewed in Figure 10 of the drawings, strikes an obstruction, such as the end of a rail or an uneven place in the rail, this end of the track shoe will lift up, the track shoe pivoting about the bolt 236. This permits the track shoe to freely pass over small irregularities in the rail. When raised and lowered the track shoe swings through an arcuate path, due to the spaced pivotal arrangement of the thrust bars 235.

Figure 14:
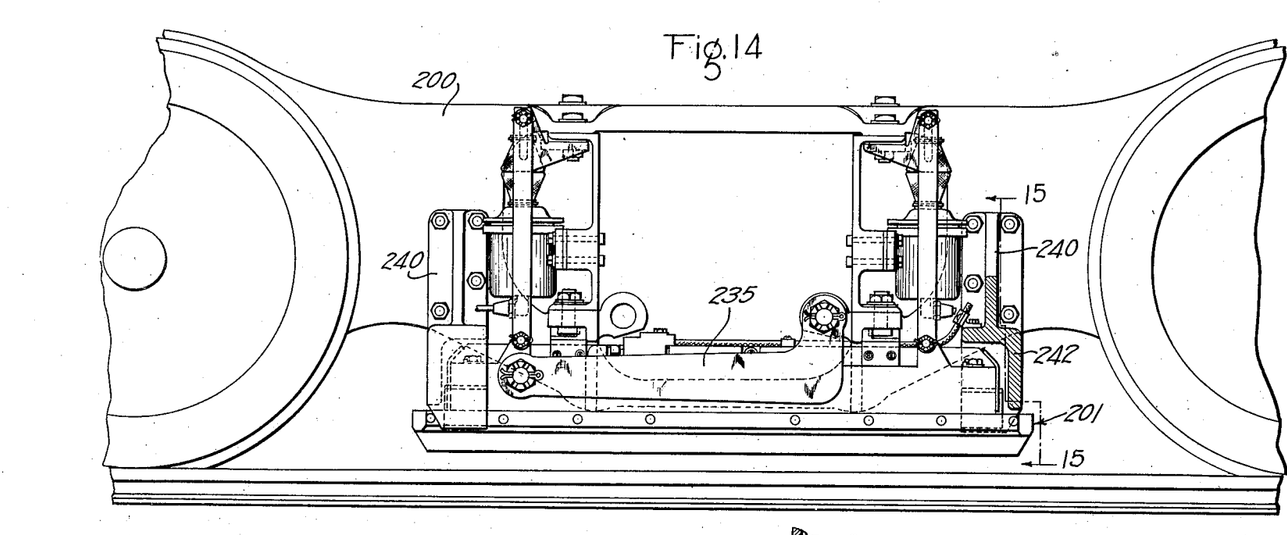
Figure 14 is an elevational view of another embodiment of the improved magnetic track brake equipment provided by my invention.
Figure 15:
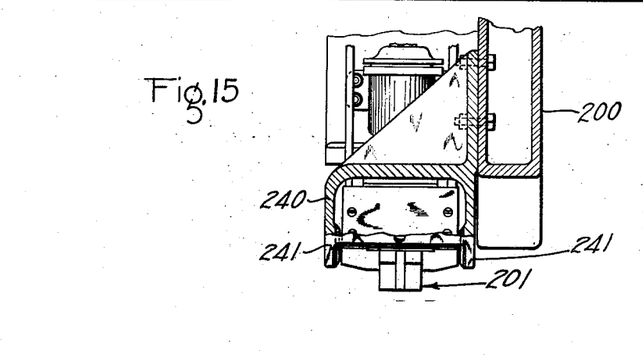
Figure 15 is a sectional view taken substantially along the line 15—15 of Figure 14.

Another embodiment of improved magnetic track brake provided by my invention is shown in Figures 14 and 15 of the drawings. This embodiment of the invention is generally similar to that shown in Figures 10 to 13 inclusive, differing from that embodiment in that it has a pair of brackets 240 which serve to limit the lateral movement of the brake shoe 201. As is clearly shown in Figure 14 of the drawings, brackets 240 are positioned adjacent each end of the track shoe 201 and these brackets have spaced, downwardly extending arms 241 which lie adjacent the opposite sides of the track shoe 201 and limit lateral movement of this member. The downwardly extending arms 241 on each of the brackets are joined by an intermediate end portion 242 which lies adjacent to, but is spaced from the end of the track shoe 201 so that in the event that the thrust bars 235 are unable to hold the track shoe it will be held by the end portion of the bracket 240. As is shown in the drawings the brackets 240 are secured to the truck frame 200 and are supported thereby.

Figure 16:
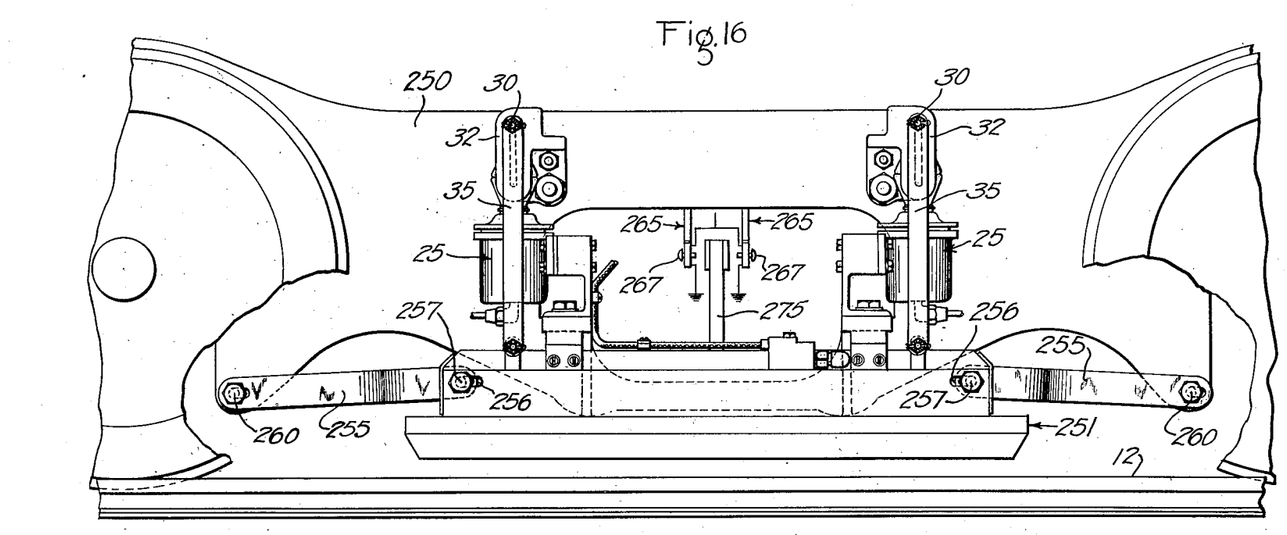
Figure 16 is an elevational view of another embodiment of the improved magnetic track brake equipment provided by my invention.

Another embodiment of the improved magnetic track brake system provided by my invention is illustrated in Figure 16 of the drawings, in which the truck frame is indicated by the reference numeral 250 and which has supported therefrom a track shoe 251. The means for moving the track shoe into and out of engagement with the rail 12 is generally similar to that employed in the embodiment of the invention illustrated in Figure 1 of the drawings and comprises a pair of fluid pressure responsive devices 25 which include members having piston chambers therein, in which are mounted pistons which are reciprocally movable in response to variations in the pressure of the fluid in the piston chambers, and which are connected to links 35 by means of the bolts 30 which are reciprocally movable in elongated openings formed in the arms of the guide members 32. The bolts 30 are connected to the shoe 251 by means of links 35 in a manner described in detail in connection with the embodiment shown in Figure 1.

This embodiment of the invention differs from that shown in Figure 1 in that it employs a different form of means to transmit from the brake shoe to the truck frame the braking force produced between the brake shoe and the rail. In this embodiment of the invention each end of the track shoe 251 is connected with an adjacent portion of the truck frame 250 by means of a link 255. Each of the links 255 has one end positioned against the laterally inner face of the brake shoe 251 and secured in an elongated opening 256 in the brake shoe by means of a pin 257. The other end of each of the links 255 is positioned against the laterally outer face of the truck frame 250 and is secured in an opening in the truck frame by means of a pin or bolt 260. The opening in the end of the link 255 through which the pin 260 extends is elongated somewhat to permit the link to move relative to the truck frame a short distance, while the elongated opening 256 in the track shoe permits the link 255 to move relative to the track shoe a short distance. This is desirable as it permits the shoe to be moved vertically without interference with the links.

When the shoe is in engagement with the track it moves longitudinally of the vehicle a short distance so as to be held by the link which is under tension.

I have illustrated in connection with this embodiment of the invention another form of safety trip switch which I may employ in place of the form shown in Figure 1 of the drawings. This trip switch, which is indicated generally at 265, is shown in detail in Figure 17 of the drawings where it will be seen that the switch has a housing which may be constructed of any suitable non-conducting material, and which has secured therein in a suitable manner a pair of contacts 266 one of which has connected thereto a wire leading to ground and the other has connected thereto a wire leading to the apparatus to be controlled. The housing also has an operating member 267 slidably fitted therein, the ends of the member 267 projecting from the sides of the housing. A pair of switch arms 268 are pivotally secured to the operating member 267 by means of a pin 269. The arms 268 are joined by a tension spring 270 which normally urges the outer ends of these arms towards each other.

Figure 17:
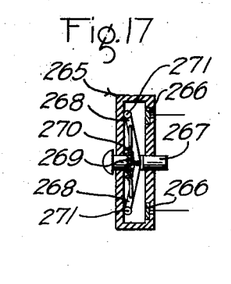
Figure 17 is a sectional view of one of the safety trip switches employed in the equipment shown in Figure 16.

This switch is normally in the open position, as shown in Figure 17 of the drawings, at which time the pivot pin 269 is located on the right hand side of a line passing through the ball elements 271 on the ends of the arms 268. In order to move the switch to the closed position the operating member 267 is moved to the left, as viewed in Figure 17, so that the pivot pin 269 is located on the left hand side of the line passing through the ball elements 271. As soon as the pivot pin 269 passes the line passing through the ball elements the spring 270 causes the arms 268 to pivot on the pin 269 with the result that the ends of the arms engage the contacts 266, while the operating member 267 is moved very rapidly to the left to the extreme end of its range of movement. This completes a circuit between the contacts 266.

When it is desired to move the switch to the open position it is necessary only to press upon the left hand end of the operating member 267 so as to move the pivot pin 269 to a point at which it is located on the right hand side of the line passing through the end portions 271 of the arms 268, at which time the spring 270 will cause the arms 268 to return to the open position.

In the magnetic track brake system illustrated in Figure 16 a pair of trip switches of the type illustrated in detail in Figure 17 are employed. These are supported in any suitable manner from the truck frame 250 and are arranged so that one of these will be moved to the closed position on relative movement of an operating member in one direction and so that the other of the switches will be moved to the closed position on relative movement of the operating member in the other direction. An operating member indicated at 275 is secured in any suitable manner upon the track brake shoe 251 and projects upwardly therefrom so as to be positioned between the two trip switches 265. The member 275 is normally held in spaced relation to the operating members 267 associated with each of the switches, but upon relative movement of the member 275 as a result of movement of the track shoe 251 beyond a certain predetermined amount it will engage one of the operating members 267 so as to move the switch elements controlled thereby to the closed position to complete a circuit to effect deenergization of the winding of the track shoe, and to effect the supply of fluid under pressure to the fluid pressure responsive devices to move the track shoe away from the rail in the manner described in detail in connection with the embodiment shown in Figure 1 of the drawings.

While one form of safety trip switch has been illustrated and described in detail in connection with the embodiment of the magnetic track brake system shown in Figure 1 of the drawings, and another form of trip switch has been illustrated and described in detail in connection with the embodiment of the magnetic track brake equipment shown in Figure 16 of the drawings it should be understood that either form of safety trip mechanism may be employed on either of these embodiments of the invention or in connection with either of the other embodiments of the invention described in this application.

It will be seen that in each of the embodiments of the magnetic track brake system provided by my invention fluid pressure means is provided to control movement of the track brake shoe out of operative relation with the rail and that this means is arranged so that when the track shoe is in the release position it is suspended on the pistons employed in the fluid pressure devices and that these pistons are held in position by fluid under pressure.

It will be seen also that in each embodiment of the magnetic track brake system provided by this invention that in order to effect movement of the track shoe into operative relation with the rail fluid under pressure is released from the fluid pressure responsive devices and that the track shoe thereupon moves by gravity to the rail. In addition it will be seen that a pair of fluid pressure responsive devices are employed and that each of these devices is connected to the brake shoe by a pair of links which are disposed upon the lateral inner and outer faces of the fluid pressure responsive devices and that these links are pivotally connected to the fluid pressure responsive devices at points vertically above these devices.

It will be seen also that in each embodiment of the invention the links connecting the brake shoe and the fluid pressure responsive devices are arranged so as to yieldingly permit a limited amount of lateral movement between the links and the parts of the fluid pressure responsive devices to which they are connected, and between the links and the track brake shoe. In addition the links are arranged so as to permit a limited amount of vertical movement between the brake shoe and the links so that the brake shoe can readily adjust itself to irregularities in the track.

Each embodiment of the system provided by my invention also incorporates means to transfer from the track brake shoe to the vehicle the braking forces between the track brake shoe and the rail and this means serves to limit the distance which the track brake shoe can move longitudinally of the car. In addition each embodiment of the system provided by this invention may be provided with safety means such as shown in connection with the embodiment illustrated in Fig. 1 and which is automatically operable in the event that the track shoe moves longitudinally of the car more than a predetermined desired distance to control the circuit to the winding of the track shoe to deenergize this winding and control the supply of pressure to the fluid pressure responsive devices so as to cause these devices to move the track brake shoe out of engagement with the rail. This serves to prevent the track shoe from getting under the wheels of the vehicle in the event that the shoe strikes an obstruction and the supporting and guiding parts yield.

While a preferred embodiment of the improved track brake system provided by my invention and several modifications of the system have been described and illustrated in detail, it should be understood that the invention is not limited to these details of construction and that numerous changes and modifications may be made without departing from the scope of the following claims.

Having now described my invention what I claim as new and desire to secure by Letters Patent, is:

1. In combination with a magnetic track brake shoe adapted for use on a car, means responsive to variations in fluid pressure for controlling movement of said track brake shoe into and out of operative relation with a rail, means to effect energization of said track brake shoe, and safety means responsive to movement of the track brake shoe longitudinally of the car in excess of a predetermined amount to control the means to energize the track brake shoe to effect deenergization of the brake shoe, and to control the fluid pressure responsive means to control movement of the track brake shoe out of operative relation with the rail.

2. In combination with a magnetic track brake shoe, means responsive to variations in fluid pressure for controlling movement of said track brake shoe into and out of operative relation with a rail, means to effect energization of said track brake shoe, and safety means responsive to movement of the track brake shoe longitudinally of the car in excess of a predetermined amount to control the means to energize the track brake shoe to effect deenergization of the brake shoe, and to control the fluid pressure responsive means to effect movement of the track brake shoe out of operative relation with the rail, the fluid pressure responsive means being operable on an increase in the pressure of the fluid acting thereon to effect movement of the track brake shoe out of operative relation with the rail and being operable upon a reduction in the pressure of the fluid acting thereon to effect movement of the track shoe into operative relation with the rail.

3. In combination with a magnetic track brake shoe, means responsive to variations in fluid pressure for controlling movement of said track brake shoe into and out of operative relation with a rail, means to effect energization of said track brake shoe, and safety means responsive to movement of the track brake shoe longitudinally of the car in excess of a predetermined amount to control the means to energize the track brake shoe to effect deenergization of the brake shoe, and to control the fluid pressure responsive means to effect movement of the track brake shoe out of operative relation with the rail, said safety means comprising a switch controlling a circuit controlling the fluid pressure responsive means and the means for energizing said track brake shoe.

4. In combination with a magnetic track brake shoe, means responsive to variations in fluid pressure for controlling movement of said track brake shoe into and out of operative relation with a rail, means to effect energization of said track brake shoe, safety means responsive to movement of the track brake shoe longitudinally of the car in excess of a predetermined amount to control the means to energize the track brake shoe to effect deenergization of the brake shoe, and to control the fluid pressure responsive means to effect movement of the track brake shoe out of operative relation with the rail, and means to transmit from the track brake shoe to the vehicle the braking force developed between the brake shoe and the rail.

5. In combination with a magnetic track brake shoe, means responsive to variations in fluid pressure for controlling movement of said track brake shoe into and out of operative relation with a rail, means to effect energization of said track brake shoe, safety means responsive to movement of the track brake shoe longitudinally of the car in excess of a predetermined amount to control the means to energize the track brake shoe to effect deenergization of the brake shoe, and to control the fluid pressure responsive means to effect movement of the track brake shoe out of operative relation with the rail, and means to transmit from the track brake shoe to the vehicle the braking force developed between the brake shoe and the rail, said means comprising a member pivotally secured to the track brake shoe and to the vehicle.

6. In combination with a magnetic track brake shoe, means responsive to variations in fluid pressure for controlling movement of said track brake shoe into and out of operative relation with a rail, means to effect energization of said track brake shoe, safety means responsive to movement of the track brake shoe longitudinally of the car in excess of a predetermined amount to control the means to energize the track brake shoe to effect deenergization of the brake shoe, and to control the fluid pressure responsive means to effect movement of the track brake shoe out of operative relation with the rail, and means to limit movement of the track brake shoe lateral of the vehicle, said means comprising a member associated with the vehicle and having portions positioned adjacent the lateral inner and outer faces of the brake shoe.

7. The combination with a magnetic rail brake shoe adapted for use on a vehicle, of fluid pressure responsive means to control movement of the brake shoe into and out of operative relation with a rail, said fluid pressure responsive means comprising a member secured to the vehicle and positioned vertically above the brake shoe, said member having a pressure chamber therein, a movable abutment subject to the pressure of fluid in said chamber, and means connecting said abutment and said brake shoe, said means comprising a pair of links pivotally secured to the brake shoe and operatively connected to said abutment, said links being disposed one at each of the opposite sides of the fluid pressure responsive means.

8. The combination with a magnetic rail brake shoe adapted for use on a vehicle, of fluid pressure responsive means to control movement of the brake shoe into and out of operative relation with a rail, said fluid pressure responsive means comprising a member secured to the vehicle and positioned vertically above the brake shoe, said member having a pressure chamber therein, a movable abutment subject to the pressure of fluid in said chamber, and means connecting said abutment and said brake shoe, said means comprising a pair of links pivotally secured to the brake shoe and operably connected to said abutment, said links being disposed one at each of the opposite sides of the fluid pressure responsive means, one of the joints between the links and the member to which the links are pivotally connected being adapted to permit relative movement between the links and said member laterally of the car.

9. The combination with the magnetic rail brake shoe adapted for use on a vehicle, of fluid pressure responsive means to control movement of the brake shoe into and out of operative relation with a rail, said fluid pressure responsive means comprising a member secured to the vehicle and positioned vertically above the brake shoe, said member having a pressure chamber therein, a movable abutment subject to the pressure of fluid in said chamber, and means connecting said abutment and said brake shoe, said means comprising a pair of links pivotally secured to the brake shoe and to means associated with said abutment, one of said links extending along the lateral outer face of the fluid pressure responsive means and the other of said links extending along the lateral inner face of the fluid pressure responsive means, one of the joints between the links and the member to which the links are pivotally connected being adapted to permit relative movement between the links and said member laterally of the car, and means associated with said joint and yieldingly opposing lateral movement of said members and the links relative to each other.

10. The combination with a magnetic rail brake shoe adapted for use on a vehicle, of fluid pressure responsive means to control movement of the brake shoe into and out of operative relation with a rail, said fluid pressure responsive means comprising a member secured to the vehicle and positioned vertically above the brake shoe, said member having a pressure chamber therein, a movable abutment subject to the pressure of fluid in said chamber, and means connecting said abutment and said brake shoe, said means comprising a pair of links pivotally secured to the brake shoe and to means associated with said abutment, one of said links extending along the lateral outer face of the fluid pressure responsive means and the other of said links extending along the lateral inner face of the fluid pressure responsive means, one of the joints between the links and the member pivotally secured thereto being adapted to permit relative vertical movement between the links and the member secured thereto.

11. The combination with a magnetic rail brake shoe for use on a vehicle adapted to run on a rail, of fluid pressure responsive means to control movement of the brake shoe into and out of operative relation with the rail, and means to transmit from the brake shoe to the vehicle the retarding force generated between the brake shoe and the rail, said means comprising a member having one end pivotally secured to said track brake shoe adjacent one end of the shoe and having the other end thereof pivotally secured to the vehicle at a point adjacent the other end of the shoe.

12. The combination with a magnetic rail brake shoe for use on a vehicle adapted to run on a rail, a fluid pressure responsive means to control movement of the brake shoe into and out of operative relation with the rail, and means to control movement of the track brake shoe relative to the vehicle longitudinally thereof, said means comprising a member having one end pivotally secured to the track brake shoe adjacent one end of the shoe and having the other end thereof pivotally secured to the vehicle at a point adjacent the other end of the shoe.

13. The combination with a magnetic rail brake shoe for use on a vehicle adapted to run on a rail, of fluid pressure responsive means to control movement of the brake shoe into and out of operative relation with the rail, and means to control movement of the track brake shoe relative to the vehicle longitudinally thereof, said means comprising a member having one end pivotally secured to the track brake shoe adjacent one end of the shoe and pivotally secured adjacent the other end thereof to the vehicle at a point adjacent the other end of the shoe, the points of attachment of the member with the track brake shoe and with the vehicle being spaced apart longitudinally of the vehicle a substantial distance.

14. The combination with a magnetic rail brake shoe for use on a vehicle adapted to run on a rail, of means for effecting movement of the brake shoe into and out of operating relation with the rail, said means including a link pivotally secured to the track shoe and extending upwardly therefrom, the upper end of link being pivotally secured to a member movable in a substantially vertical plane, the link being adapted to exert a downward pull on said member on movement of the track shoe longitudinally of the vehicle while in engagement with a rail, and means to prevent downward movement of said member beyond a predetermined position, whereby on movement of said member to said position and on further longitudinal movement of the track shoe relative to the vehicle the link tends to lift the track shoe away from the rail, one of the joints between the link and the members secured thereto being adapted to permit relative movement between the link and said member laterally of the car.

15. The combination with a magnetic rail brake shoe for use on a vehicle adapted to run on a rail, means for effecting movement of the brake shoe into and out of operating relation with a rail, said means including a link pivotally secured to the track shoe and extending upwardly therefrom, the upper end of the link being pivotally secured to a member movable in a substantially vertical plane, the link being adapted to exert a downward pull on said member on movement of the track shoe longitudinally of the vehicle while in engagement with a rail, means to prevent downward movement of said member beyond a predetermined position, whereby on movement of said member to said position and on further longitudinal movement of the track shoe relative to the vehicle the link tends to lift the track shoe away from the rail, one of the joints between the link and the members secured thereto being adapted to permit relative movement between the links and said member laterally of the car, and means yieldingly opposing relative movement of the link and said member.

16. The combination with a magnetic rail track shoe adapted for use on a vehicle, means for effecting movement of the track shoe into and out of operating relation with a rail, said means including a link pivotally secured to the track shoe and extending upwardly therefrom, a guide member associated with the vehicle and having a movable member associated therewith and movable relative thereto in generally vertical plane, said link being pivotally secured to said movable member, the track shoe being adapted to exert a downward pull on said movable member on movement of said shoe longitudinally of the vehicle while in engagement with a rail, the guide member preventing downward movement of the movable member beyond a predetermined position, whereby on movement of the movable member to said predetermined position and on further movement of the track shoe longitudinally relative to the vehicle the link tends to lift the track shoe away from the rail.

17. In a vehicle brake, in combination, a magnetic brake shoe adapted to engage a rail, means for energizing said shoe, and means operative upon an excessive longitudinal movement of the shoe relative to the vehicle for effecting the deenergization of said shoe.

18. In a vehicle brake, in combination, a magnetic brake shoe adapted to engage a rail, means for energizing said shoe, and means operative upon longitudinal movement of the shoe relative to the vehicle in excess of a predetermined amount for effecting the movement of the shoe away from the rail.

19. In a vehicle brake, in combination, a magnetic brake shoe adapted to engage a rail, means for energizing said shoe, and means operative upon an excessive longitudinal movement of the shoe relative to the vehicle for effecting the movement of the shoe away from the rail and for effecting the deenergization of said shoe.

20. In a vehicle brake, in combination, a magnetic rail brake shoe, a motor adapted to be secured to a vehicle truck to effect movement of the rail brake shoe into and out of operative relation with a rail, the shoe having an upwardly projecting ear associated therewith, a link connecting said ear and the motor, and means associated with the vehicle truck and adapted to be engaged by the ear on the rail brake shoe to limit movement of the rail brake shoe laterally of the vehicle.

21. In a vehicle brake, in combination, a magnetic rail brake shoe, fluid pressure operated means adapted to be secured to a vehicle truck to effect movement of the rail brake shoe into and out of operative relation with a rail, the shoe having an upwardly projecting ear associated therewith, a link connecting the ear and the fluid pressure operated means, a member associated with the vehicle truck and adapted to be engaged by said ear to limit movement of the rail brake shoe laterally of the vehicle, and means associated with the rail brake shoe and adapted to engage means carried by said member to limit movement of the shoe away from the rail.

22. In a vehicle brake, in combination, a magnetic rail brake shoe, a motor adapted to be secured to a truck of the vehicle and to effect movement of the rail brake shoe into and out of operative relation with a rail, the shoe having an upwardly projecting ear associated therewith, a link connecting said ear and the motor, and a member associated with the vehicle truck and surrounding the ear on the rail brake shoe and adapted to be engaged by the ear on the rail brake shoe to limit lateral movement of the rail brake shoe relative to the vehicle truck, the link being pivotally secured to the ear on the rail brake shoe, the point of connection between the link and the said ear being located above said member in all operating positions of the said rail brake shoe.

23. In a vehicle brake, in combination, a magnetic rail brake shoe, means to effect movement of the said rail brake shoe into and out of operative relation with a rail, and means to secure the shoe against movement relative to the vehicle longitudinally thereof, said means comprising an arm pivotally secured to the brake shoe adjacent one end of the said shoe, and pivotally secured to the vehicle truck at a point adjacent the other end of the said shoe.

24. In a vehicle brake, in combination, a magnetic rail brake shoe, means to effect movement of the said rail brake shoe into and out of operative relation with the rail, and means to secure the shoe against movement relative to the vehicle longitudinally thereof, said means comprising an arm pivotally secured adjacent one end of the said shoe to a member carried by the brake shoe, and pivotally secured at a point adjacent the other end of the said shoe to a member carried by the vehicle truck, the connection between one end of the said arm and the member pivotally connected thereto being adapted to permit relative movement between said arm and the said member laterally of the vehicle.

25. In a vehicle brake, in combination, a magnetic rail brake shoe, a motor adapted to be secured to a truck of the vehicle to effect movement of the rail brake shoe into and out of engagement with a rail, the brake shoe having a portion projecting upwardly therefrom, means associated with the vehicle truck and extending around the projecting portion on the rail brake shoe and adapted to be engaged thereby to limit lateral movement of the rail brake shoe relative to the vehicle truck, means connecting the said projecting portion and the motor, the point of connection between said means and the projecting portion being disposed above the means extending around the projecting portion in all operating positions of the said brake shoe.

26. In a vehicle brake, in combination, a magnetic rail brake shoe, means associated with a vehicle truck for effecting movement of the brake shoe into and out of operative relation with a rail, and means to secure the shoe against longitudinal movement relative to the vehicle truck, said means comprising a bracket associated with the vehicle truck and disposed vertically above the shoe and adjacent one end thereof, and a member pivotally secured to the said bracket and to the shoe at a point adjacent the opposite end of the said shoe.

27. In a vehicle brake, in combination, a magnetic rail brake shoe, means associated with a vehicle truck for effecting movement of the brake shoe into and out of operative relation with a rail, and means to secure the shoe against longitudinal movement relative to the vehicle truck, said means comprising a bracket associated with the vehicle truck and disposed vertically above the shoe and adjacent one end of the shoe, and a pair of members pivotally secured to the bracket and pivotally secured to the shoe at a point adjacent the opposite end of the said shoe, one of said members extending along one side of the shoe, the other of the said members extending along the other side of the said shoe.

28. In a vehicle brake, in combination, a magnetic rail brake shoe, means associated with a vehicle truck for effecting movement of the brake shoe into and out of operative relation with a rail, and means to secure the shoe against longitudinal movement relative to the vehicle truck, said means comprising a bracket associated with the vehicle truck and disposed vertically above the shoe and adjacent one end thereof, and a pair of members, one of said members extending along one side of the shoe, the other of the members extending along the other side of the shoe, said members being secured to the bracket so as to be pivotal relative thereto on a common axis extending laterally of the vehicle, and being secured to the shoe at a point adjacent the end of the shoe remote from the bracket so as to be pivotal relative thereto on a common axis substantially parallel to the first named axis.

29. In a vehicle brake, in combination, a magnetic rail brake shoe, means associated with a vehicle truck for effecting movement of the brake shoe into and out of operative relation with a rail, and means to secure the shoe against longitudinal movement relative to the vehicle truck, said means comprising a bracket associated with the vehicle truck and disposed vertically above the shoe and adjacent one end thereof, and a pair of members, one of said members extending along one side of the shoe, the other of the members extending along the other side of the shoe, said members being secured to the bracket so as to be pivotal on a common axis extending laterally of the vehicle, and being secured to the shoe at a point adjacent the end of the shoe remote from the bracket so as to be pivotal on a common axis substantially parallel to the first named axis, the connection between the members and the shoe and the bracket being adapted to permit lateral movement of the members relative to the shoe and bracket.

30. In a vehicle brake, in combination, a magnetic rail brake shoe, means associated with a vehicle truck for effecting movement of the brake shoe into and out of operative relation with a rail, and means to secure the shoe against longitudinal movement relative to the vehicle truck, said means comprising a bracket associated with the vehicle truck and disposed vertically above the shoe and adjacent one end thereof, and a pair of members, one of said members extending along one side of the shoe, the other of the members extending along the other side of the shoe, said members being secured to the bracket so as to be pivotal on a common axis extending laterally of the vehicle, and being secured to the shoe at a point adjacent the end of the shoe remote from the bracket so as to be pivotal on a common axis substantially parallel to the first named axis, the connection between the members and the shoe and bracket being adapted to permit lateral movement of the members relative to the shoe and the bracket and relative to each other.

31. In a vehicle brake, in combination, a vehicle truck having a pair of longitudinally spaced brackets associated therewith and extending over a rail, a magnetic track brake shoe disposed beneath said brackets, the shoe having upwardly projecting portions disposed adjacent each end thereof, the brackets having means associated therewith and extending around the said upwardly projecting portions and adapted to be engaged thereby to limit lateral movement of the shoe relative to the vehicle truck, each of the said brackets having a fluid pressure operated device associated therewith, the device associated with one bracket being connected to the upwardly projecting portion on one end of the shoe, the device associated with the other bracket being connected to the upwardly projecting portion on the other end of the shoe.

32. In a vehicle brake, in combination, a vehicle truck having a pair of longitudinally spaced brackets associated therewith and extending over a rail, a magnetic track brake shoe disposed beneath said brackets, the shoe having upwardly projecting portions disposed adjacent each end thereof, the brackets having means associated therewith and extending around the said upwardly projecting portions and adapted to be engaged thereby to limit lateral movement of the shoe relative to the vehicle truck, each of the said brackets having a fluid pressure operated device associated therewith, the device associated with one bracket being connected to the upwardly projecting portion on one end of the shoe, the device associated with the other bracket being connected to the upwardly projecting portion on the other end of the shoe, and common means for controlling the supply of fluid to and the release of fluid from said fluid pressure operated devices.

33. In a vehicle brake, in combination, a vehicle truck having a pair of longitudinally spaced brackets associated therewith and extending over a rail, a magnetic track brake shoe disposed beneath said brackets, the shoe having an upwardly projecting portion disposed adjacent each end thereof, the brackets having means associated therewith and extending around the said upwardly projecting portions and adapted to be engaged thereby to limit lateral movement of the shoe relative to the vehicle truck, each of the said brackets having a fluid pressure operated device associated therewith, the device associated with one bracket being connected to the upwardly projecting portion on one end of the shoe, the device associated with the other bracket being connected to the upwardly projecting portion on the other end of the shoe, and means to secure the shoe against longitudinal movement relative to the vehicle truck, said means comprising members pivotally secured to the shoe adjacent one end thereof and pivotally secured to one of the brackets at a point adjacent the other end of the shoe.

34. In a vehicle brake, in combination, a vehicle truck having a pair of longitudinally spaced brackets associated therewith and extending over a rail, a magnetic track brake shoe disposed beneath said brackets, each of said brackets having a fluid pressure operated device associated therewith, one of said devices being connected to the shoe adjacent one end of the shoe, the other of said devices being connected to the shoe adjacent the other end thereof, said devices controlling movement of the shoe into and out of operating relation with a rail, and means to secure the shoe against longitudinal movement relative to the vehicle truck, said means comprising members pivotally secured to the shoe adjacent one end thereof and pivotally secured to one of the brackets at a point adjacent the other end of the shoe.

35. In a vehicle brake, in combination, a magnetic rail brake shoe, a motor adapted to be secured to a vehicle truck to effect movement of the rail brake shoe into and out of operative relation with a rail, the shoe having a pair of laterally spaced upwardly projecting ears associated therewith, links connecting the ears and the motor, and a member associated with the vehicle truck and surrounding the said ears to limit lateral movement of the shoe by engagement of said ears with said member.

36. In a brake equipment for a vehicle having a truck, in combination, a magnetic rail brake shoe, a pair of fluid pressure operated devices carried by the vehicle truck for controlling movement of the rail brake shoe into and out of operating relation with a rail, said fluid pressure operated devices being substantially vertically disposed, said devices being spaced apart longitudinally of the vehicle truck, one of said devices being positioned adjacent one end of the rail brake shoe, the other of the devices being positioned adjacent the other end of the rail brake shoe, and means to limit movement of the rail brake shoe longitudinally of the vehicle, said means comprising a member pivotally secured to the shoe adjacent one end of the shoe and pivotally secured to the vehicle truck at a point adjacent the other end of the shoe.

37. In a brake equipment for a vehicle having a truck, in combination, a magnetic rail brake shoe, a pair of fluid pressure operated devices carried by the vehicle truck for controlling movement of the rail brake shoe into and out of operating relation with a rail, said fluid pressure operated devices being substantially vertically disposed and being spaced apart longitudinally of the vehicle truck, one of said devices being positioned adjacent one end of the rail brake shoe, the other of the devices being positioned adjacent the other end of the rail brake shoe, each of said fluid pressure operated devices being connected to the rail brake shoe through a link having one end pivotally connected to a member carried by the rail brake shoe and having its other end pivotally connected to a member associated with the fluid pressure operated device, one of the pivotal connections between each of the links and a member to which the link is connected being adapted to permit relative movement between the link and said member laterally of the vehicle.

38. In a brake equipment for a vehicle adapted to run on a rail and having a truck element, in combination, a magnetic rail brake shoe element, means associated with the truck element to effect movement of the brake shoe element into and out of operative relation with a rail, and means to secure the shoe against movement relative to the truck element longitudinally thereof, said means comprising an arm pivotally connected to the brake shoe element adjacent one end thereof and pivotally connected to the truck element at a point adjacent the other end of the brake shoe element, the connection between said arm and one of said elements being adapted to permit relative movement between said arm and said element laterally of the vehicle.

39. In a brake equipment for a vehicle adapted to run on a rail and having a truck element, in combination, a magnetic rail brake shoe element, means associated with the truck element to effect movement of the brake shoe element into and out of operative relation with a rail, and means to secure the shoe against movement relative to the truck element longitudinally thereof, said means comprising an arm pivotally connected to the brake shoe element adjacent one end thereof and pivotally connected to the truck element at a point adjacent the other end of the brake shoe element, each of said connections being adapted to permit relative movement between said arm and the element connected thereto laterally of the vehicle.

40. In a brake apparatus for a vehicle adapted to run on a rail and having a truck, a rail brake shoe, means associated with the vehicle truck for effecting movement of the brake shoe into and out of operating relation with a rail, a bracket associated with said truck, a roller rotatably supported by said bracket and adapted to be engaged by an end of the brake shoe to limit longitudinal movement of the shoe relative to the truck, said roller having a groove therein, the brake shoe having a tongue thereon adapted to extend into said groove and to engage the walls thereof to limit movement of the brake shoe laterally thereof.

CLYDE C. FARMER.